United States Patent
Kim

(10) Patent No.: US 8,982,717 B2
(45) Date of Patent: Mar. 17, 2015

(54) APPARATUS AND METHOD FOR DETECTING TRANSMISSION POWER OF TERMINAL HAVING HETEROGENEOUS MODEM CHIPS

(75) Inventor: Pilsang Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 571 days.

(21) Appl. No.: 12/973,564

(22) Filed: Dec. 20, 2010

(65) Prior Publication Data
US 2012/0002559 A1    Jan. 5, 2012

(30) Foreign Application Priority Data
Jun. 30, 2010 (KR) .................. 10-2010-0062393

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 52/30* | (2009.01) |

(52) U.S. Cl.
CPC ............ *H04W 52/30* (2013.01); *H04B 1/3838* (2013.01)
USPC ....................................................... 370/252

(58) Field of Classification Search
USPC ......................................................... 370/252
See application file for complete search history.

(56) References Cited

U.S. PATENT DOCUMENTS

| | | | | |
|---|---|---|---|---|
| 6,052,037 | A   * | 4/2000  | Kaku et al. ..................... | 332/100 |
| 2003/0235147 | A1* | 12/2003 | Walton et al. ................. | 370/204 |
| 2004/0082295 | A1* | 4/2004  | Ngai et al. .................... | 455/13.4 |
| 2005/0135312 | A1  | 6/2005  | Montojo et al. | |
| 2006/0003793 | A1* | 1/2006  | Ngai et al. .................... | 455/522 |
| 2007/0111681 | A1* | 5/2007  | Alberth et al. ............. | 455/127.1 |
| 2007/0135154 | A1  | 6/2007  | Gautier et al. | |

(Continued)

FOREIGN PATENT DOCUMENTS

GB          2349522 A        11/2000

OTHER PUBLICATIONS

Federal Communications Commission—Office of Engineering & Technology—Evaluating Compliance with FCC—Guidelines for Human Exposure to Radiofrequency Electromagnetic Fields—Additional Information for Evaluating Compliance of Mobile and Portable Devices with FCC Limits for Human Exposure to Radiofrequency Emissions—Supplement C Edition 01-01.*

*Primary Examiner* — Noel Beharry
(74) *Attorney, Agent, or Firm* — Birch, Stewart, Kolasch & Birch, LLP

(57) ABSTRACT

An apparatus according to an embodiment of the invention, the apparatus for detecting transmission power of a first communication scheme in a mobile communication terminal having a first modem for the first communication scheme and a second modem for a second communication scheme which is different from the first communication scheme, includes: a feedback circuit configured to detect a high frequency signal outputted from a power amplifier of the first communication scheme and convert the detected high frequency signal into an analog signal; a reception unit configured to receive the analog signal outputted from the feedback circuit and band information transmitted from the first modem for the first communication scheme; and an output unit configured to output a particular value after comparing a signal outputted from the reception unit and a predetermined signal.

20 Claims, 2 Drawing Sheets

(56) References Cited

U.S. PATENT DOCUMENTS

2009/0275355 A1* 11/2009 Tan et al. ............... 455/522
2009/0305742 A1* 12/2009 Caballero et al. ............ 455/566
2010/0062801 A1* 3/2010 Kim et al. ............... 455/552.1
2011/0043328 A1* 2/2011 Bassali ................... 340/5.71

* cited by examiner

APPARATUS AND METHOD FOR DETECTING TRANSMISSION POWER OF TERMINAL HAVING HETEROGENEOUS MODEM CHIPS

CROSS REFERENCE TO RELATED APPLICATIONS

The present application is related to and claims priority to Korean patent application 10-2010-0062393, filed on Jun. 30, 2010, the entire contents of which being hereby incorporated by reference.

BACKGROUND OF THE INVENTION

1. Field of the Invention

The present invention relates to an apparatus for detecting transmission power of a mobile terminal having heterogeneous modems and, more particularly, to an apparatus and method for detecting code division multiple access (CDMA) transmission power of a simultaneous voice-long term evolution (LTE) (SVLTE) terminal.

2. Description of the Related Art

The specification of a specific absorption rate (SAR) of a CDMA-only terminal minimizes a SAR margin in order to secure a total radiated power (TRP) performance. Here, wireless performance increases as the TRP becomes larger, but because the TRP is harmful to human body, it has been designated as an SAR measurement item for terminal specifications. In general, when transmission power of CDMA is around 24 dB, it reaches an SAR standard limit value. Also, long term evolution (LTE)-only device SAR specifications minimize the SAR margin in order to secure the TRP performance. Here, the SAR is proportional to the TRP. Namely, as the TRP increases, the SAR value increases, thus when maximum TRP is output, the SAR reaches a limit value. Thus, a terminal operating based on both CDMA and LTE, the SAR problem arises, failing to satisfy federal communications commission (FCC) standards.

SUMMARY OF THE INVENTION

Therefore, in order to address the above matters, the various features described herein have been conceived.

An object of the present invention is to allow a terminal having heterogeneous modems to detect transmission power to thereby solve a SAR problem that can be generated when communications are simultaneously performed.

According to an aspect of the present invention, there is provided an apparatus for detecting transmission power of a first communication scheme in a mobile communication terminal having a first modem for the first communication scheme and a second modem for a second communication scheme which is different from the first communication scheme, including: a feedback circuit configured to detect a high frequency signal outputted from a power amplifier of the first communication scheme and convert the detected high frequency signal into an analog signal; a reception unit configured to receive the analog signal outputted from the feedback circuit and band information transmitted from the first modem for the first communication scheme; and an output unit configured to output a particular value after comparing a signal outputted from the reception unit and a predetermined signal.

The particular value is a high or low value outputted from a comparator of the output unit.

The first communication scheme may be a code division multiple access (CDMA) scheme.

The second communication scheme may be an orthogonal frequency-division multiple access (OFDMA) scheme.

The output unit may include a plurality of comparators in order to divide transmission power in the first communication scheme and detect the divided transmission power. The reception unit may include a plurality of band pins, and the plurality of band pins are respectively connected with output signal paths of the reception unit.

The band pins are respectively connected with the first modem for the first communication scheme.

The signal path outputted from the reception unit may be determined according to band information received from the first modem for the communication scheme.

The reception unit may be configured to have impedance having such a size as not to change voltage outputted from the feedback circuit.

The apparatus may further include an offset compensator for compensating for the difference between band outputs outputted from the reception unit.

According to another aspect of the present invention, there is provided an apparatus for detecting transmission power of a first communication scheme in a mobile communication terminal having a first modem for the first communication scheme and a second modem for a second communication scheme which is different from the first communication scheme, including: a feedback circuit configured to detect a high frequency signal outputted from a power amplifier of the first communication scheme and convert the detected high frequency signal into an analog signal; and an analog-to-digital converter (ADC) configured to convert an analog signal outputted from the feedback circuit into a digital signal.

The ADC may be provided in the second modem for the second communication scheme.

According to exemplary embodiments of the present invention, because transmission power of CDMA of a terminal operating based on both CDMA and LTE is detected, a potential SAR problem can be solved, and because the terminal is based on actual measurement data and configured by hardware, a real time implementation can be possible. In addition, the hardware configuration can minimize MIPS consumption.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiments of the present invention will be described below in detail with reference to the accompanying drawings, where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art.

Figure 1:
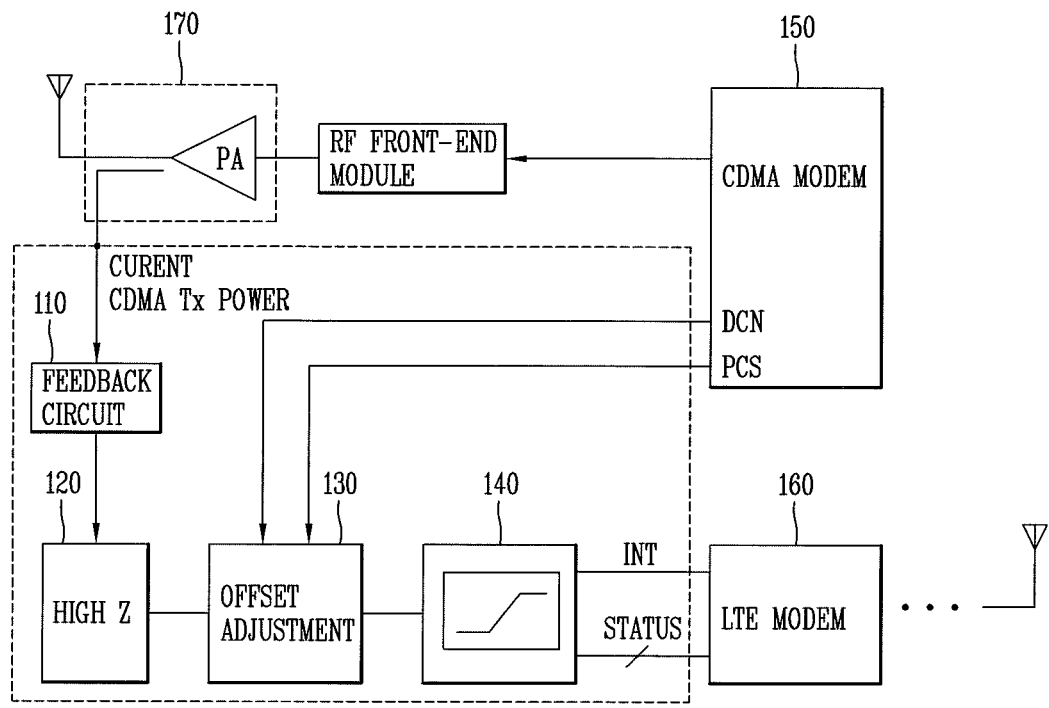
FIG. 1 is a schematic block diagram of an apparatus for detecting transmission power of a first communication scheme in a mobile communication terminal having a first modem for the first communication scheme and a second modem for a second communication scheme according to an exemplary embodiment of the present invention.

FIG. 1 is a schematic block diagram of an apparatus for detecting transmission power of a first communication scheme in a mobile communication terminal having a first modem for the first communication scheme and a second modem for a second communication scheme according to an exemplary embodiment of the present invention. In particular, FIG. 1 shows an apparatus for triggering an operation of a power back off algorithm of an LTE modem by detecting CDMA transmission power of an SVLTE terminal.

The apparatus for detecting transmission power includes a feedback circuit 110, a reception unit 120, an output unit 140, an offset compensator 130, and the like.

The feedback circuit 110 detects a high frequency signal outputted from a power amplifier 170 based on a first communication scheme and converts the detected high frequency signal into an analog signal. The first communication scheme corresponds to a CDMA scheme. The CDMA scheme may be one of a CDMA digital cellular network (DCN) scheme operating at 800 MHz and a CDMA personal communication system (PCS) scheme operating at 1900 MHz. However, the invention is not limited to the CDMA scheme. Various communication schemes such as WCDMA, GSM, and the like, may be applicable. Also, different frequencies may be applicable.

In the embodiment of FIG. 1, the feedback circuit 110 may include a high power detector (HDET) circuit. The second modem 160 for the second communication scheme may be an LTE modem, but is not limited thereto. The second modem 160 has a power back off circuit configured to operate a power back off algorithm.

When the first communication scheme is the CDMA communication scheme, a corresponding high frequency signal (800 MHz~1900 MHz) outputted through the power amplifier 170 is inputted to the feedback circuit 110. In feedback circuit 110, a power level of the high frequency signal is converted into an analog signal having a voltage of 0~3V and then outputted to reception unit 120. Here, Table 1 shows the relationship between representative transmission power values of the high frequency signal and the voltage values of the converted analog signal according to an embodiment of the invention. Other embodiments may include different transmission powers and/or output voltages.

TABLE 1

| CDMA transmission power (dB) from power amplifier 170 | Voltage (V) output from feedback circuit 110 |
|---|---|
| 24 | 2.7 |
| 23 | 2.5 |
| 22 | 2.3 |
| 21 | 2.1 |

Table 1 may be one of multiple tables used by reception unit 120. That is, because an output power range of a digital cellular network (DCN) at 800 MHz and an output power range of a personal communication system (PCS) at 1900 MHz are different, different tables may be used for DCN and PCS operations. The selection of the different tables may based on band identification information received via a connector or band input pin, as described below.

When more than one table is used in reception unit 120, reception unit 120 receives not only the analog signal outputted from the feedback circuit 110 but also receives band identification information transmitted from the first modem. The band identification information transmitted from the first modem allows reception unit 120 to select the table that corresponds to the band identification (e.g., a table for DCN or a table for PCS.)

In one embodiment, reception unit 120 includes a plurality of connections or band pins. The connectors or band pins are connected with the first modem 150.

In one embodiment, band identification information can be transmitted from the first modem 150 by transmitting an impulse signal to the connectors or band pins connected to the reception unit 120.

For example, a signal may be transmitted only to the connector or band pin corresponding to the band used in the first communication scheme (e.g., the signal corresponding to the band used is set to be 1), and a signal may not transmitted to the other remaining band pins (e.g., the signal corresponding to the band not being used is set to be 0).

In a more specific example, in a state where a plurality of connectors or band pins connect the first modem 150 to the reception unit 120, an impulse signal is transmitted only to a pin corresponding to the band identification information currently searched or currently in traffic, to allow the reception unit 120 to know about the band identification information. Other methods of differentiating the band identifications from the first modem 150 may be used.

In a more specific example, in a state where connectors or band pins regarding DCN and connectors or band pins regarding PCS are both connected to the first modem 150 and the reception unit 120, when communication is currently performed according to the DCN communication scheme, a signal is transmitted to the connectors or band pins regarding DCN (e.g., the signal on the DCN pin is set to be 1) and a signal is not transmitted to the connectors or band pins regarding PCS (e.g., the signal on the PCS pin is set to be 0), thereby indicating to the reception unit 120 that DCN is the mode of the first modem 150.

Alternatively, when communication is currently performed according to the PCS communication scheme, a signal is transmitted to the connectors or band pins regarding PCS (e.g., the signal on the PCS pin is set to be 1) and a signal is not transmitted to the connectors or band pins regarding DCN (e.g., the signal on the DCN pin is set to be 0), thereby indicating to the reception unit 120 that PCS is the mode of the first modem 150. Other coding schemes or signals may be used to differentiate various modes of the first modem 150.

In another embodiment, the plurality of connectors or band pins of reception unit 120 may be connected to different output signal paths of the reception unit 120 according to the signal(s) informing about the band identification information currently searched or in traffic.

In this embodiment, a signal path outputted from the reception unit 120 is determined according to band identification information transmitted from the first modem 150. Namely, when the band identification information transmitted from the first modem 150 is band identification information regarding DCN, the analog signal is outputted to a downstream device on an output signal path connected to the pin of the DCN band identification information. Also, when the band identification information transmitted from the first modem 150 is band identification information regarding PCS, the analog signal is outputted to a downstream device on an output signal path connected to the pin of the PCS band identification information. Thus, devices downstream from the reception unit 120 may be informed about the communication mode of the first modem 150. Alternatively, a signal path may exist between the first modem and the downstream devices (e.g., offset compensator 130 and/or output unit 140, discussed below) to inform the downstream devices about the mode of the first modem 150.

Also, the reception unit 120 is configured with an impedance having a size chosen so as to avoid affecting the output of the CDMA modem.

In one embodiment, the signals outputted by reception unit 120 are directly inputted to one or more comparators of output unit 140. In another embodiment, an offset compensator 130 (discussed below) may be connected between reception unit 120 and output unit 140.

The output unit 140 compares a signal outputted from the reception unit 120 and a pre-set voltage value, and outputs a particular value as a comparison result. Here, the particular value is one of a high or low value outputted from a comparator of the output unit 140. The output unit includes at least one comparator.

In one embodiment, in order to more minutely monitor the transmission power value of the first communication scheme (i.e., in order to divide the power level more precisely), the output unit 140 may include a plurality of comparators. Here, when the voltage value of the signal inputted to the output unit 140 is greater than one of a plurality pre-set voltage values, a corresponding comparator outputs a high value, and when the voltage value of the signal inputted to the output unit 140 is smaller than the pre-set voltage value, the corresponding comparator outputs a low value. Each comparator outputs a high value or a low value.

The pre-set voltage value may be variably set according to the voltage value of the converted analog signal output by reception unit 120 and corresponding to the power value transmitted by power amplifier 170 according to the first communication scheme.

Figure 2:
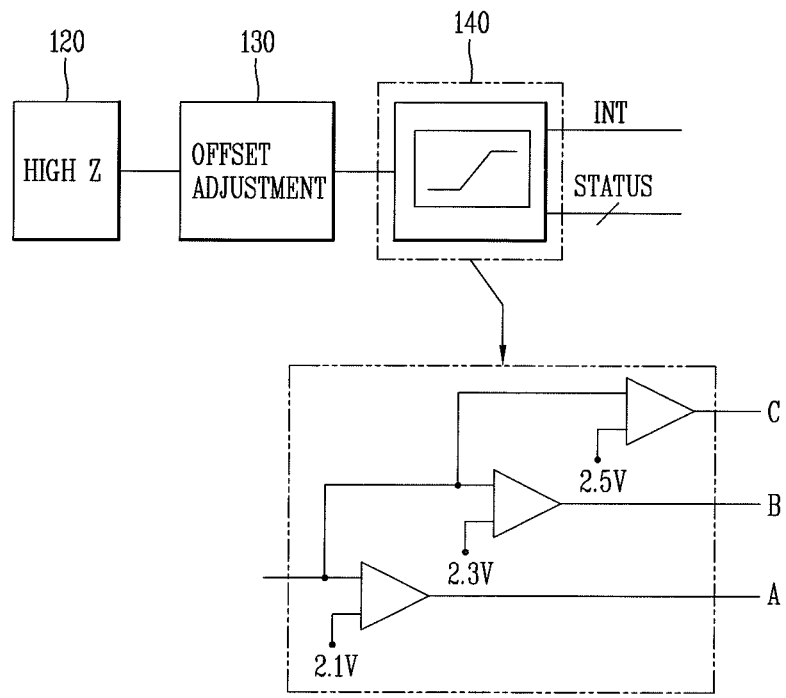
FIG. 2 is a schematic block diagram showing an output unit including three comparators according to an exemplary embodiment of the present invention.

FIG. 2 is a schematic block diagram showing an output unit 140 including three comparators according to an exemplary embodiment of the present invention.

As shown in FIG. 2, when the output unit 140 includes three comparators, values outputted from each comparator according to the output of reception unit 120 (i.e., according to the transmission power value in the first communication scheme) transferred to the output unit 140 may be represented as shown in Table 2 below. Here, 2.1V is previously set in the comparator representing an output value of A (corresponding to a first modem amplified output power of 21 dB or higher), 2.3V is previously set in the comparator representing an output value of B (corresponding to a first modem amplified output power of 22 dB or higher), 2.5V is previously set in the comparator representing an output value of C (corresponding to a first modem amplified output power of 23 dB or higher).

TABLE 2

| Output voltage of reception unit 120 | Output level of comparator A | Output level of comparator B | Output level of comparator C |
|---|---|---|---|
| 2.5 V (corresponding to a first modem amplified output power of 23 dB or higher) | H | H | H |

TABLE 2-continued

| Output voltage of reception unit 120 | Output level of comparator A | Output level of comparator B | Output level of comparator C |
|---|---|---|---|
| 2.3 V (corresponding to a first modem amplified output power of 22 dB or higher) | H | H | L |
| 2.1 V (corresponding to a first modem amplified output power of 21 dB or higher) | H | L | L |

With reference to Table 2, in case where the DCN scheme is used as the first communication scheme, when a voltage value of 2.1V or greater (corresponding to a first modem amplified output power of 21 dB or higher) is inputted to the output unit 140, only the output value of A is high, and the output value of the other remaining two comparators are low. In addition, when a value of 2.3V or greater (corresponding to a first modem amplified output power of 22 dB or higher) is inputted to the output unit 140, the output values of A and B are high, and the output value of C is low. Also, when a value of 2.5V or greater (corresponding to a first modem amplified output power of 23 dB or higher) is inputted to the output unit 140, the three comparators each output high values.

In another embodiment where the DCN scheme is used as the first communication scheme, output unit 140 includes a fourth comparator representing an output value of D, with a threshold of 2.7V (corresponding to a first modem amplified output power of 24 dB or higher). In other embodiments, additional comparators (and corresponding values in Tables 1 and 2) may be used.

In a case where the PCS scheme is used as the first communication scheme, when a voltage value of first value or greater (corresponding to a first PCS amplified power level or higher) is inputted to the output unit 140, only the output value of A is high, and the output value of the other remaining two comparators are low. In addition, when a voltage value of second value or greater (corresponding to a second PCS amplified power level or higher) is inputted to the output unit 140, the output values of A and B are high, and the output value of C is low. Also, when a voltage value of a third value or greater (corresponding to a third PCS amplified power level or higher) is inputted to the output unit 140, the three comparators each output high values.

When output unit 140 includes a fourth comparator representing an output value of D, with a fourth threshold voltage (corresponding to a fourth PCS amplified output power or higher). As noted above, additional comparators (and corresponding values in Tables 1 and 2) may be used in other embodiments.

The outputs of output unit 140 are used to trigger the previously identified power back off device/algorithm of the second modem 160 for the second communication scheme (e.g., LTE) can be adjusted. That is, in the related art, when the power output by the first modem is high, this output power may exceed a limit value of the specific absorption rate (SAR) (e.g., a SAR determined in the FCC standard). However, with proper values used in Tables 1 and 2, the present invention ensures the limit value of the specific absorption rate (SAR) is not exceeded by triggering the transmission power back off algorithm of the second modem 160.

In another embodiment, an offset compensator 130 may also be connected between reception unit 120 and output unit 140 so as to compensate for a voltage difference between outputs of the bands (e.g., DCN and PCS bands) outputted from the reception unit 120. That is, if the values of Table 1 are different for the DCN and PCS bands, the voltage difference between feedback outputs of the respective bands with respect to the same transmission power is compensated for. Thus, even when a plurality of band identification information is transmitted from the first modem 150 for the first communication scheme, different transmission powers in the first communication scheme can be detected via a single output unit 140.

In another embodiment, a calibration unit may be connected to an output stage of the reception unit 120. The calibration unit informs the output unit 140 by using the information inputted through the feedback circuit 110. The calibration unit calibrates the output unit 140 so that a uniform output can be obtained from the output unit 140 despite an external influence such as DCN/PCS deviation, deviation of each test sample, temperature characteristics, and the like.

Figure 3:
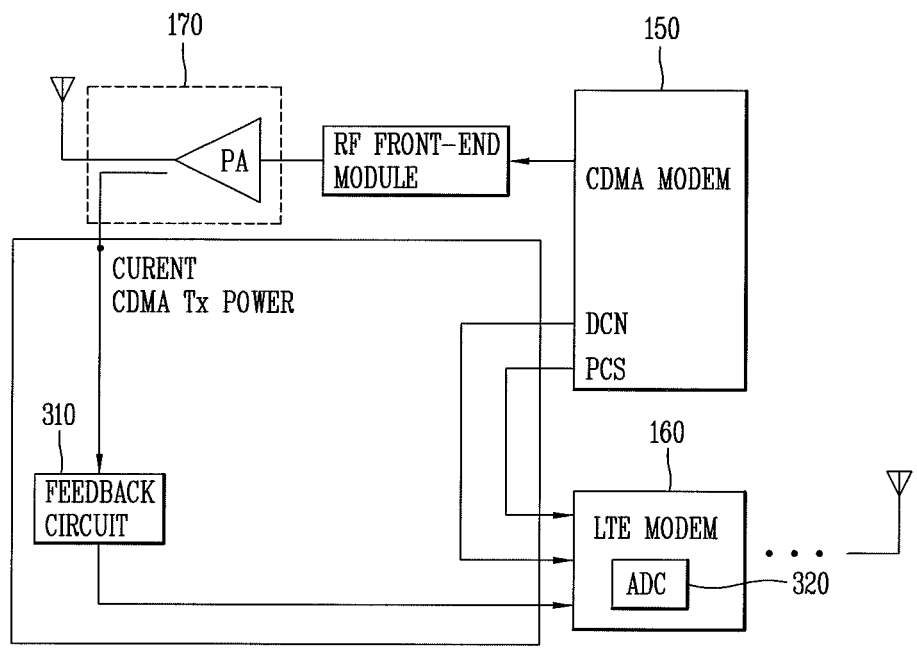
FIG. 3 is a schematic block diagram of an apparatus for detecting transmission power of a first communication scheme in a mobile communication terminal having a first modem for the first communication scheme and a second modem for a second communication scheme according to an exemplary embodiment of the present invention.

FIG. 3 is a schematic block diagram of an apparatus for detecting transmission power of a first communication scheme in a mobile communication terminal having a first modem for the first communication scheme and a second modem for a second communication scheme according to an exemplary embodiment of the present invention.

The apparatus for detecting transmission power includes a feedback circuit 310 and an analog-to-digital converter (ADC) 320.

The feedback circuit 310 detects a high frequency signal outputted from a power amplifier of the first communication scheme and converts it into an analog signal. The first communication scheme corresponds to a CDMA scheme. However, without being limited to the CDMA scheme, various communication schemes such as WCDMA, GSM, and the like, may be applicable. Here, the feedback circuit 310 may be an HDET circuit.

When the first communication scheme is the CDMA communication scheme, when a high frequency signal (800 MHz~1900 MHz) outputted through the power amplifier is inputted to the feedback circuit 310, the high frequency signal is converted into an analog signal having a voltage of 0~3V and then the analog signal is outputted. Here, Table 1 shows an exemplary relationship between the transmission power value input to feedback circuit 310 and the voltage value of the converted analog signal output from feedback circuit 310 according to the CDMA scheme.

The ADC converter 320 converts the analog signal outputted from the feedback circuit into a digital signal. The ADC 320 may be provided in the conversion circuit or may be in the second modem for the second communication scheme. The second modem for the second communication scheme receives the digital signal that has passed through the ADC 320 and band identification information transmitted from the first modem for the first communication scheme. Here, the first modem for the first communication scheme and the second modem for the second communication scheme are connected by a plurality of band pins. Thus, the second modem for the second communication scheme can know about band identification information of the first modem through the plurality of band pins connected to the first modem for the first communication scheme. Here, an LTE modem is used as the second modem for the second communication scheme, but the present invention is not limited thereto.

Thus, the second modem for the second communication scheme is able to detect an operation trigger for a transmission power back off algorithm by measuring a voltage value outputted from the feedback circuit 310.

As noted above, the apparatus for detecting transmission power may include a feedback circuit 110, a reception unit 120, an output unit 140, an offset compensator 130. This apparatus may be integrated into a mobile communication device. The apparatus may be configured to be installed in a variety of mobile communication devices including devices where the first modem 150 is only a DCN CDMA modem, only a PCS CDMA modem, and a CDMA modem that may be switched between a DCN CDMA mode and a PCS CDMA mode.

In another embodiment of the invention, there are methods, corresponding to the above-described devices, for ensuring the limit value of the specific absorption rate (SAR) is not exceeded by triggering the transmission power back off algorithm of the second modem 160. For example, there is a method that includes detecting the amplified power level of the signal emitted by power amplifier 170. The method further includes: converting the amplified power level of the signal into an analog signal, and outputting the analog signal; receiving identification information identifying the first communication scheme, and outputting a signal corresponding to the received analog signal and the identification information; and outputting a particular value to the power back off circuit after comparing a voltage of the signal corresponding to the received analog signal and the identification information with a corresponding predetermined voltage. The method may use tables similar to those shown in Tables 1 and 2 above.

In another embodiment, there is a method that includes detecting the amplified power level of the signal and convert the amplified power level into an analog signal; and converting the analog signal into a digital signal.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling transmission power of a mobile communication terminal using heterogeneous communication schemes, comprising:

transmitting, by a first modem, a first signal according to a first communication scheme;

transmitting, by a second modem having a power back off circuit, a second signal according to a second communication scheme, the second communication scheme being different from the first communication scheme;

detecting, by a detector, a transmission power level of the first signal and generating a status signal to trigger the power back off circuit based on the detected transmission power level of the first signal; and controlling, by the second modem, a transmission power level of the second signal to satisfy a specific absorption rate (SAR) when the detected transmission power level of the first signal has reached a pre-set power level and the power back off circuit is triggered by the status signal, wherein the detector includes:

a feedback circuit configured to convert an amplified power level of the first signal into an analog signal, and output the analog signal;

a reception unit configured to receive the analog signal and information identifying the first communication scheme, and output a signal corresponding to the received analog signal and information; and an output unit configured to receive the signal output by the reception unit and to output the status signal to the power back off circuit to trigger the power back off circuit after comparing the signal output from the reception unit and a pre-set power level.

2. The method of claim 1, wherein the first communication scheme is one of a code division multiple access (CDMA) scheme, a wideband DMA (WCDMA) and a global system for mobile systems (GSM).

3. The method of claim 2, wherein the CDMA scheme is one of a personal communication system CDMA scheme and a digital cellular network CDMA scheme.

4. The method of claim 1, wherein the second communication scheme is one of a long term evolution (LTE) scheme and an orthogonal frequency-division multiple access (OFDMA) scheme.

5. The method of claim 1, wherein the pre-set power level is smaller than a maximum transmission power level.

6. The method of claim 1, wherein the transmission power level of the second signal is reduced so that a limit value of the SAR is not exceeded.

7. The method of claim 1, wherein the pre-set power level is varied according to the transmission power level of the first signal according to the first communication scheme.

8. The method of claim 1, wherein the generating the status signal comprises:
generating the status signal by comparing the detected transmission power level of the first signal to a single pre-set power level.

9. The method of claim 1, wherein the generating the status signal comprises:
generating the status signal by comparing the detected transmission power level of the first signal to a plurality pre-set power levels.

10. A mobile communication terminal using heterogeneous communication schemes, the mobile communication terminal comprising:
a first modem configured to transmit a first signal according to a first communication scheme;
a second modem having a power back off circuit and configured to transmit a second signal according to a second communication scheme, the second communication scheme being different from the first communication scheme; and
a detector configured to detect a transmission power level of the first signal and generate a status signal to trigger the power back off circuit,
wherein the second modem is further configured to control a transmission power level of the second signal to satisfy a specific absorption rate (SAR) when the power back off circuit is triggered by the status signal, and wherein the detector includes:
a feedback circuit configured to convert an amplified power level of the first signal into an analog signal, and output the analog signal;
a reception unit configured to receive the analog signal and information identifying the first communication scheme, and output a signal corresponding to the received analog signal and information; and
an output unit configured to receive the signal output by the reception unit and to output the status signal to the power back off circuit to trigger the power back off circuit after comparing the signal output from the reception unit and a pre-set power level.

11. The mobile communication terminal of claim 10, wherein the first communication scheme is one of a code division multiple access (CDMA) scheme, a wideband DMA (WCDMA) and a global system for mobile systems (GSM).

12. The mobile communication terminal of claim 11, wherein the CDMA scheme is one of a personal communication system CDMA scheme and a digital cellular network CDMA scheme.

13. The mobile communication terminal of claim 10, wherein the second communication scheme is one of a long term evolution (LTE) scheme and an orthogonal frequency-division multiple access (OFDMA) scheme.

14. The mobile communication terminal of claim 10, wherein the pre-set power level is smaller than a maximum transmission power level.

15. The mobile communication terminal of claim 10, wherein the transmission power level of the second signal is reduced so that a limit value of the SAR is not exceeded.

16. The mobile communication terminal of claim 10, wherein the pre-set power level is varied according to the transmission power level of the first signal according to the first communication scheme.

17. The mobile communication terminal of claim 10, wherein the output unit includes a comparator configured to output the status signal after comparing the transmission power level of the first signal and the pre-set power level.

18. The mobile communication terminal of claim 10, wherein the output unit includes a plurality of comparators, each of the plurality of comparators configured to output a corresponding status signal after comparing the transmission power level of the first signal and the pre-set power level.

19. The mobile communication terminal of claim 10, wherein the second modem generates a status signal by comparing the detected transmission power level of the first signal to a single pre-set power level.

20. The mobile communication terminal of claim 10, wherein the second modem generates a status signal by comparing the detected transmission power level of the first signal to a plurality pre-set power levels.

* * * * *